(12) United States Patent
Witt (10) Patent No.: US 9,776,350 B2
(45) Date of Patent: Oct. 3, 2017

(54) TAMPER EVIDENT CLOSURE AND METHOD OF MAKING SAME

(71) Applicant: Stanpac Inc., Smithville (CA)

(72) Inventor: Steven Hugh Witt, Smithville (CA)

(73) Assignee: Stanpac Inc. (CA)

( * ) Notice: Subject to any disclaimer, the term of this patent is extended or adjusted under 35 U.S.C. 154(b) by 15 days.

(21) Appl. No.: 14/700,826

(22) Filed: Apr. 30, 2015

(65) Prior Publication Data

US 2016/0083149 A1    Mar. 24, 2016

Related U.S. Application Data

(63) Continuation of application No. PCT/CA2014/051208, filed on Dec. 12, 2014.

(60) Provisional application No. 62/052,616, filed on Sep. 19, 2014.

(51) Int. Cl.
| | |
|---|---|
| B65D 41/48 | (2006.01) |
| B29C 45/40 | (2006.01) |
| B29C 45/44 | (2006.01) |
| B29L 31/56 | (2006.01) |
| B29C 45/26 | (2006.01) |

(52) U.S. Cl.
CPC ............ B29C 45/40 (2013.01); B29C 45/44 (2013.01); B65D 41/485 (2013.01); *B29C 45/2622* (2013.01); *B29L 2031/565* (2013.01)

(58) Field of Classification Search
CPC  B65D 41/32; B65D 2101/0023; B29C 45/40; B29L 2031/565
USPC ....... 215/317, 320, 321, 344, 255, 256, 329, 215/252
See application file for complete search history.

(56) References Cited

U.S. PATENT DOCUMENTS

| | | | |
|---|---|---|---|
| 2,068,389 A | 1/1937 | Smith | |
| 3,189,209 A | 6/1965 | Owens | |
| 3,441,161 A * | 4/1969 | Van Baarn | B65D 41/0421 215/235 |
| 4,090,630 A * | 5/1978 | Wiedmer | B65D 41/185 215/320 |
| 4,090,631 A * | 5/1978 | Grussen | B29C 45/2618 215/329 |
| 4,347,943 A * | 9/1982 | Hackwell | B65D 43/0212 215/320 |

(Continued)

OTHER PUBLICATIONS

International Search Report and Written Opinion of the International Searching Authority for International Application No. PCT/CA2014/051208 filed on Dec. 12, 2014.

*Primary Examiner* — James N Smalley
(74) *Attorney, Agent, or Firm* — Emerson, Thomson & Bennett, LLC; Roger D. Emerson (57) ABSTRACT

A one piece molded tamper evident push-on closure suitable for closing an opening of a bottle, and method for manufacture thereof. The closure includes a cap portion, a latch ring portion and a frangible connector connecting the cap portion and the latch ring portion. The closure includes a plurality of resiliently deformable teeth extending inwardly from the latch ring portion and towards the cap portion for engaging the latch ring portion onto the neck of the bottle. The closure includes a manually engageable tab projecting from the latch ring portion to permit application of a manual force to rupture the frangible connector and permit the cap portion to be at least partially disconnected from the latch ring portion.

12 Claims, 7 Drawing Sheets

(56) References Cited

U.S. PATENT DOCUMENTS

| | | | |
|---|---|---|---|
| 4,470,513 A * | 9/1984 | Ostrowsky | B65D 41/3428 |
| | | | 215/252 |
| 4,700,860 A * | 10/1987 | Li | B65D 41/48 |
| | | | 215/253 |
| 5,875,908 A | 3/1999 | Witt et al. | |
| 5,971,183 A | 10/1999 | Bartsch | |
| 6,126,026 A * | 10/2000 | Ekkert | B29C 45/26 |
| | | | 215/329 |
| 6,341,707 B1 | 1/2002 | Witt et al. | |
| 6,588,614 B2 * | 7/2003 | Neuner | B65D 51/32 |
| | | | 215/40 |
| 7,513,377 B1 * | 4/2009 | Culley | B65D 41/3428 |
| | | | 215/252 |
| 7,878,351 B2 | 2/2011 | Falzoni et al. | |
| 2001/0027957 A1 * | 10/2001 | Kano | B65D 41/0421 |
| | | | 215/341 |
| 2005/0127023 A1 * | 6/2005 | Mockli | B65D 41/485 |
| | | | 215/256 |

* cited by examiner

FIG.7 ion (PCT) Patent Application No. PCT/CA2014/051208 filed on Dec. 12, 2014 in accordance with 35 U.S.C. §363, §371, §365 and §120 (also known as a "bypass application"), which in turn, claims the benefit of U.S. Provisional Patent Application No. 62/052,616, filed on Sep. 19, 2014. This application also claims the benefit of U.S. Provisional Patent Application No. 62/052,616, filed on Sep. 19, 2014 under 35 U.S.C. §119(e). Both International (PCT) Application No. PCT/CA2014/0151208 and U.S. Provisional Application No. 62/052,616 are hereby incorporated by reference in their entireties.

TAMPER EVIDENT CLOSURE AND METHOD OF MAKING SAME

CROSS-REFERENCE TO RELATED APPLICATIONS

This application is a continuation of and claims the benefit of International (PCT) Patent Application No. PCT/CA2014/051208 filed on Dec. 12, 2014 in accordance with 35 U.S.C. §363, §371, §365 and §120 (also known as a "bypass application"), which in turn, claims the benefit of U.S. Provisional Patent Application No. 62/052,616, filed on Sep. 19, 2014. This application also claims the benefit of U.S. Provisional Patent Application No. 62/052,616, filed on Sep. 19, 2014 under 35 U.S.C. §119(e). Both International (PCT) Application No. PCT/CA2014/0151208 and U.S. Provisional Application No. 62/052,616 are hereby incorporated by reference in their entireties.

FIELD

The present disclosure relates to tamper evident closures and methods of making such closures. In particular, the present disclosure may be relevant to snap-on closures suitable for use with re-usable containers, such as glass milk bottles.

BACKGROUND

Tamper evident closures are typically fitted over container openings by the manufacturer, and provide visual indication to the consumer if the closure has been opened or otherwise tampered with. Typically, tamper evident closures have a feature that must be dislocated or ruptured in order to open the closure (e.g., a seal that must be broken), and once dislocated or ruptured cannot be returned to its initial state, thus clearly indicating the closure has been opened. Examples of such lids include U.S. Pat. No. 5,875,908 and U.S. Pat. No. 6,341,707.

Such closures often have teeth that engage with the container and prevents opening of the closure unless the tamper evident feature is dislocated or ruptured. The teeth should be able to sufficiently engage with the container and should be sufficiently robust to prevent opening of the closure without dislocating or rupturing the tamper evident feature. However, limitations in the manufacturing process and/or the process of fitting the closure over the container opening may result in the teeth being insufficiently engaged with the container and/or insufficiently robust.

In the case of snap-on closures, it may also be desirable to ensure that the closure can provide a liquid-tight seal similar to that provided by screw-on closures.

SUMMARY

In some example embodiments, the present disclosure provides a one piece molded tamper evident push-on closure suitable for closing an opening of a bottle, comprising: a cap portion comprising a sidewall and an top wall; a plurality of engageable protrusions on an inner surface of the top wall of the cap portion for enabling rotation of the closure during molding; a latch ring portion; a plurality of resiliently deformable teeth extending inwardly from the latch ring portion and towards the cap portion for engaging the latch ring portion onto the neck of the bottle, each tooth being connected to the latch ring portion at a proximal end and having a reinforced distal end; a frangible connector connecting the cap portion and the latch ring portion; and a manually engageable tab projecting from the latch ring portion to permit application of a manual force to rupture the frangible connector and permit the cap portion to be at least partially disconnected from the latch ring portion.

In some example embodiments, the present disclosure provides a method for manufacturing a one piece molded tamper evident push-on closure, the method comprising: injecting a polymer into a mold to mold the closure, the mold including mold cavities to mold protruding teeth of the closure; engaging protrusions on the molded closure and rotating the closure within the mold, the closure being rotated to a release position in which the protruding teeth of the closure are freed from the corresponding mold cavities; and releasing the molded closure from the mold.

In some example embodiments, the present disclosure provides a one piece molded tamper evident push-on closure suitable for closing an opening of a bottle, comprising: a cap portion comprising a sidewall and an top wall; a first continuous annular ridge protruding inwardly from the top wall of the cap portion for engaging the opening of the bottle; a second continuous ridge protruding inwardly from the sidewall of the cap portion for engaging a neck of the bottle; a latch ring portion; a plurality of resiliently deformable teeth extending inwardly from the latch ring portion and towards the cap portion for engaging the latch ring portion onto the neck of the bottle; a frangible connector connecting the cap portion and the latch ring portion; and a manually engageable tab projecting from the latch ring portion to permit application of a manual force to rupture the frangible connector and permit the cap portion to be at least partially disconnected from the latch ring portion.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Reference is made to FIGS. 1-6, showing an example closure 10 in accordance with the present disclosure. The closure 10 may be a snap-on closure such as a snap-on cap, and may be suitable for use to close an opening of a bottle such as a glass or plastic bottle (e.g., a glass milk bottle). The closure 10 may be manufactured using a one-piece molding process, as described further below.

The closure 10 may include a cap portion 100 and a latch ring portion 200. The cap portion 100 and the latch ring portion 200 may be interconnected by way of a frangible connector 300. The frangible connector 300 may be configured to be easily tearable using manual force, to separate the cap portion and the latch ring portion 200. The frangible connector 300 may comprise a plurality of frangible tabs with spacing therebetween, or may comprise a section of tearable material (e.g., a thinner section of material compared to the cap portion 100 and the latch ring portion 200), for example.

The cap portion 100 may include an top wall 102 and a side wall 104 extending about the periphery 103 of the top wall 102. The top wall 102 may be substantially planar, as shown in the example drawings, or may be domed, for example. The side wall 104 may be textured on its outer surface (e.g., with evenly-spaced raised ridges 105, as in the example drawings) to facilitate manual gripping and removal of the cap portion 100. The closure 10 may be dimensioned to fit over the opening of a standard glass milk bottle. For example, the closure 10 may be approximately circular or cylindrical in shape, with a diameter in the range of about 1.5"-2.5", preferably about 2", and a height in the range of about 0.50"-0.75", preferably about 0.65"-0.70". Other geometries and dimensions may be suitable, depending on the opening to be closed.

Figure 1:
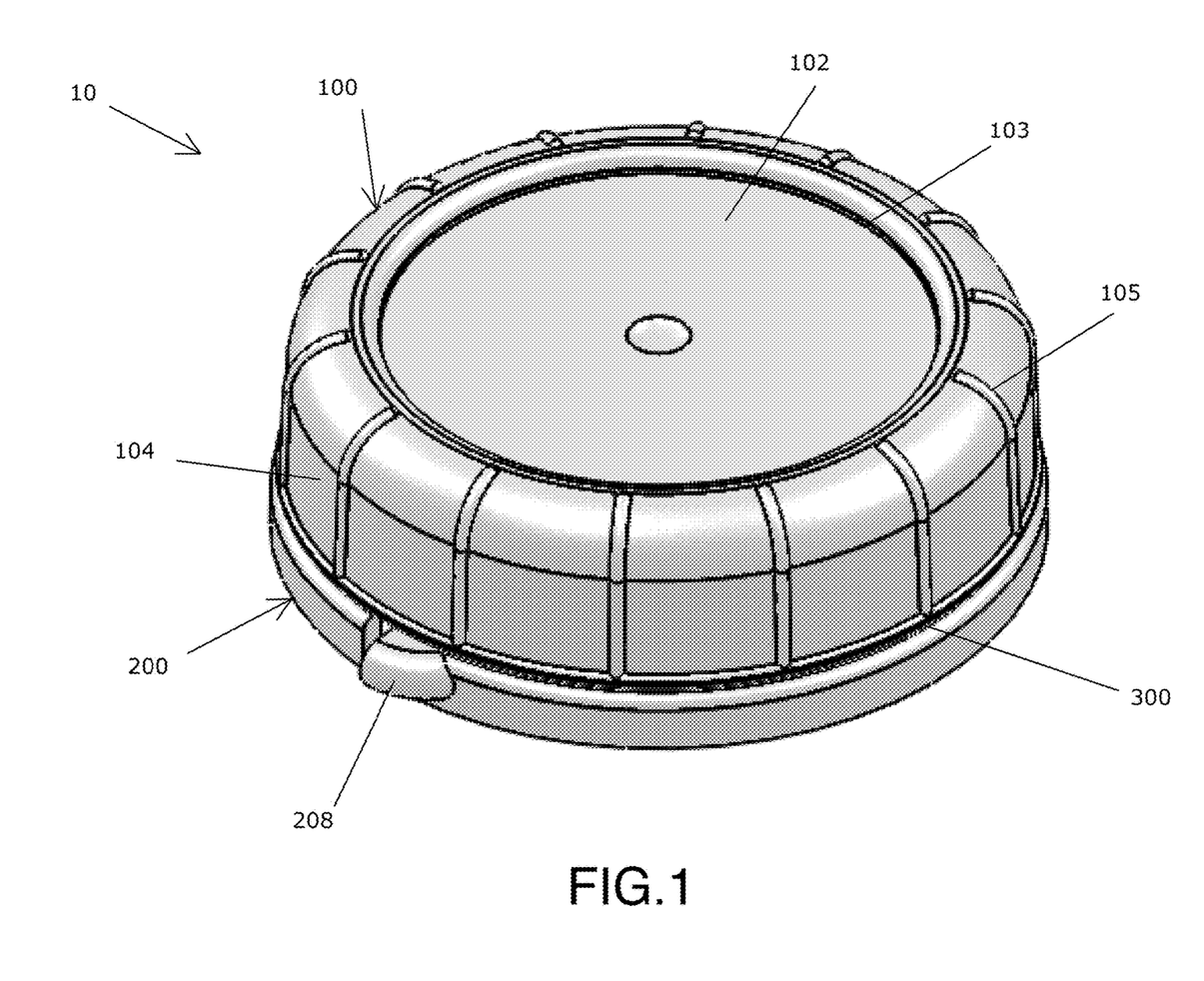
FIG. 1 is a perspective view of an example closure in accordance with the present disclosure.
Figure 2:
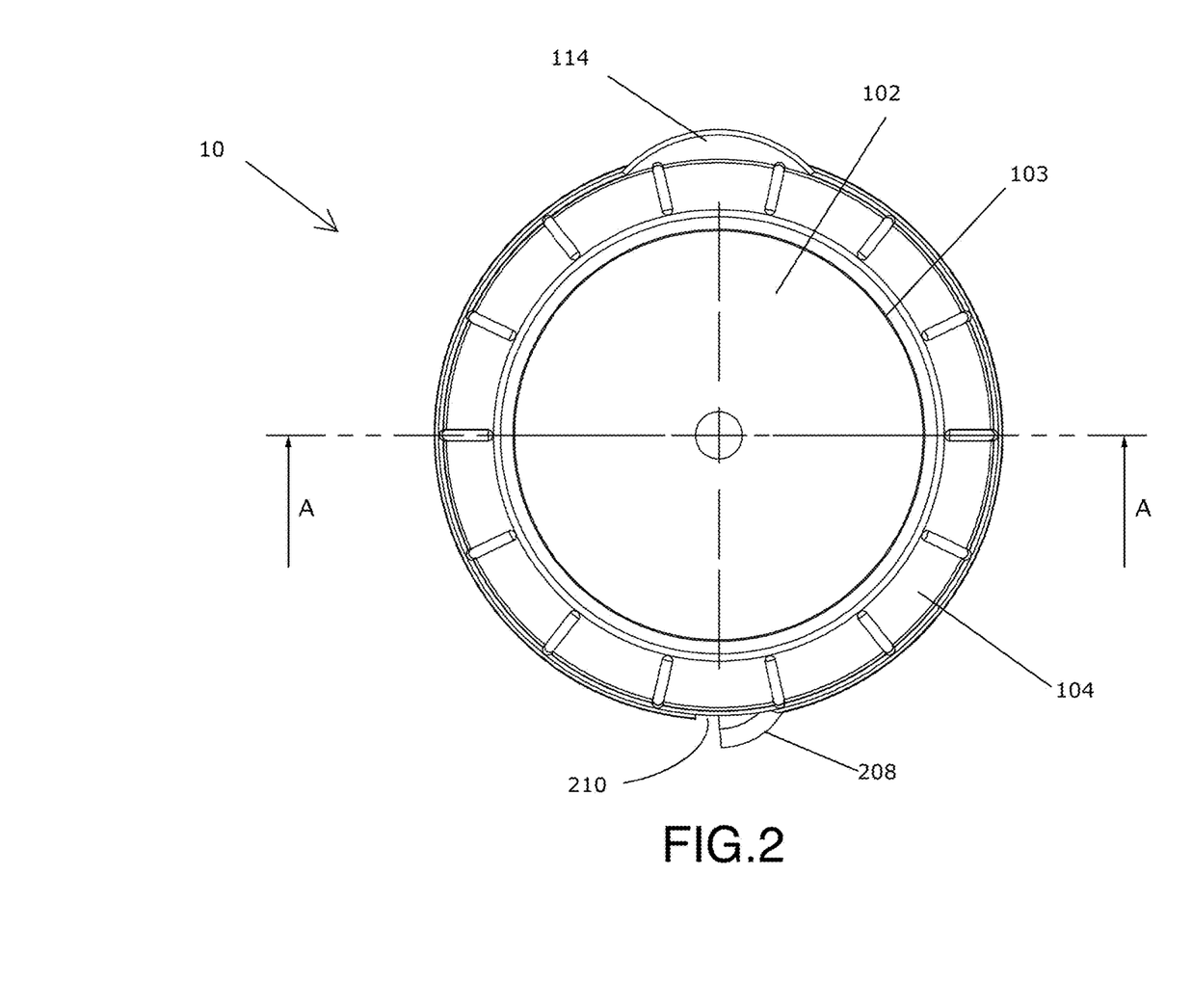
FIG. 2 is a plan view of the top of the example closure of FIG. 1.
Figure 3:
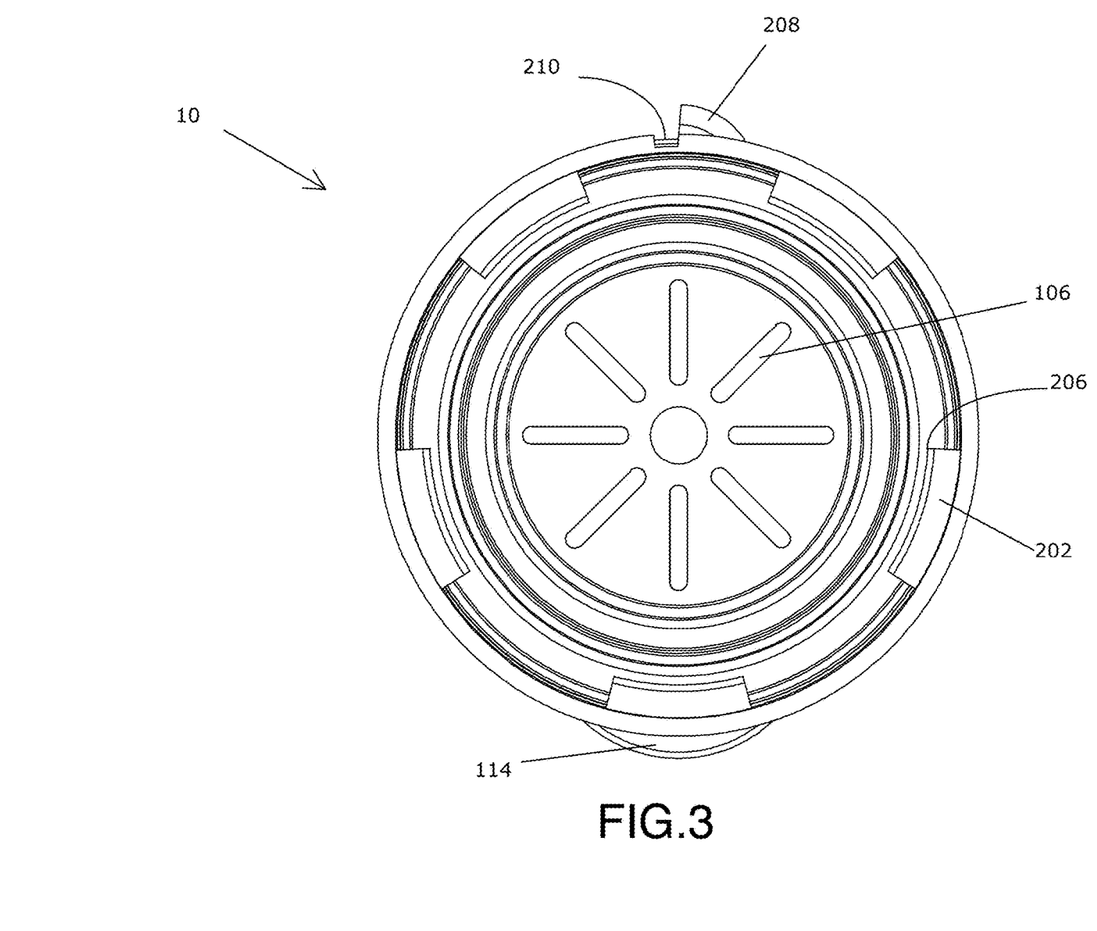
FIG. 3 is a plan view of the bottom of the example closure of FIG. 1.

The top wall 102 may be provided with a plurality of engageable protrusions 106 protruding from the inner surface of the top wall 102. The protrusions 106 may be arranged in a spoke-like formation, and may be designed to facilitate rotation of the closure 10 in a mold during manufacture, as described further below. Although FIG. 3 shows eight protrusions 106 arranged evenly in a spoke-like formation, it should be understood that other numbers and/or arrangements of protrusions 106 may be suitable.

Figure 4:
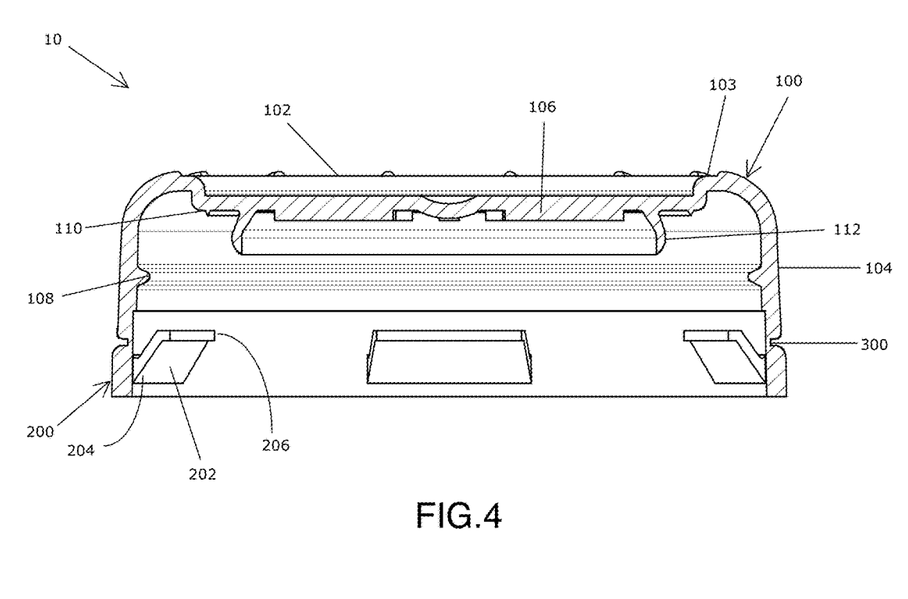
FIG. 4 is a cross-sectional view of the example closure of FIG. 1, across line A-A of FIG. 2.
Figure 5:
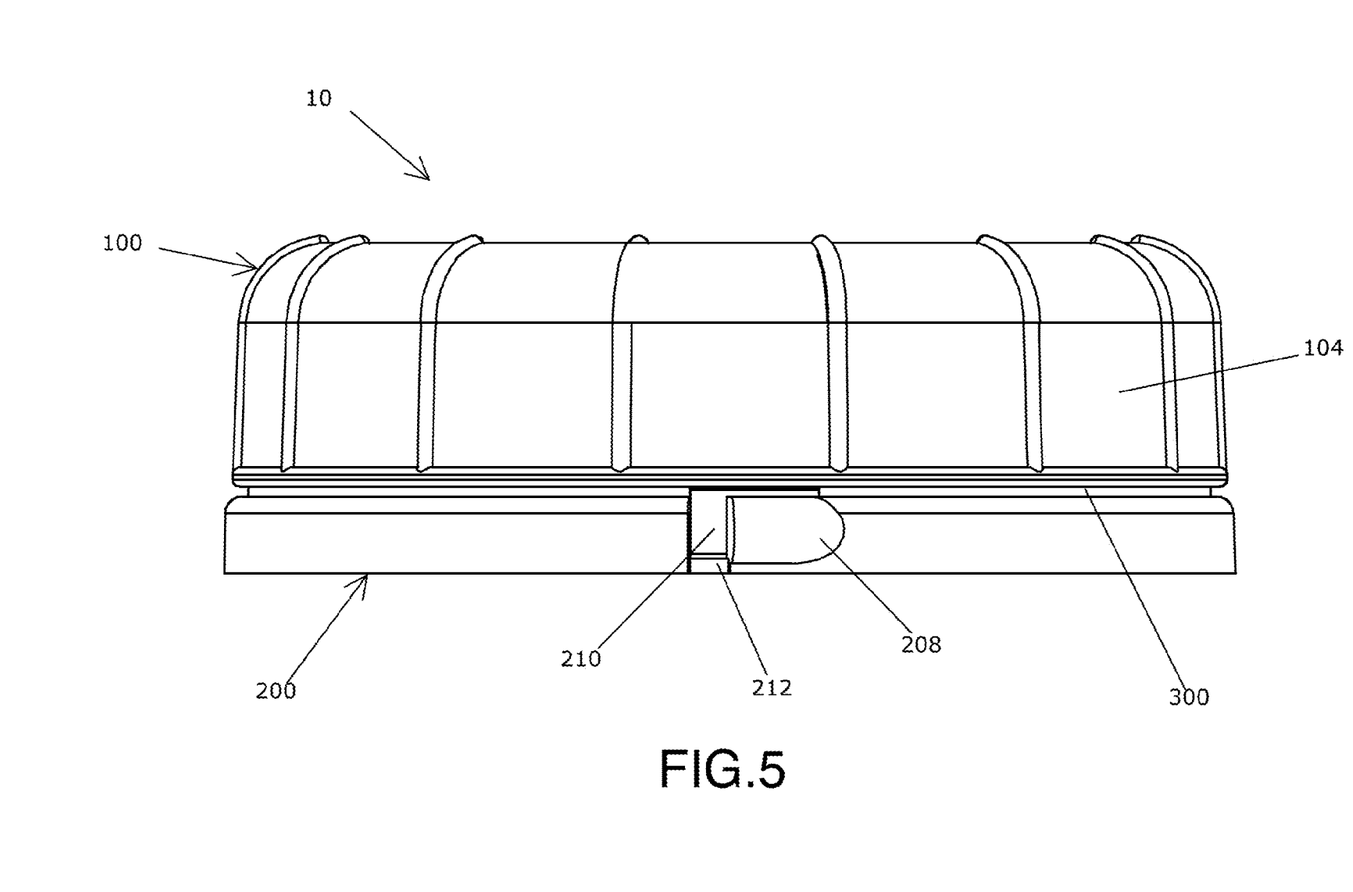
FIG. 5 is a plan view of a side of the example closure of FIG. 1.
Figure 6:
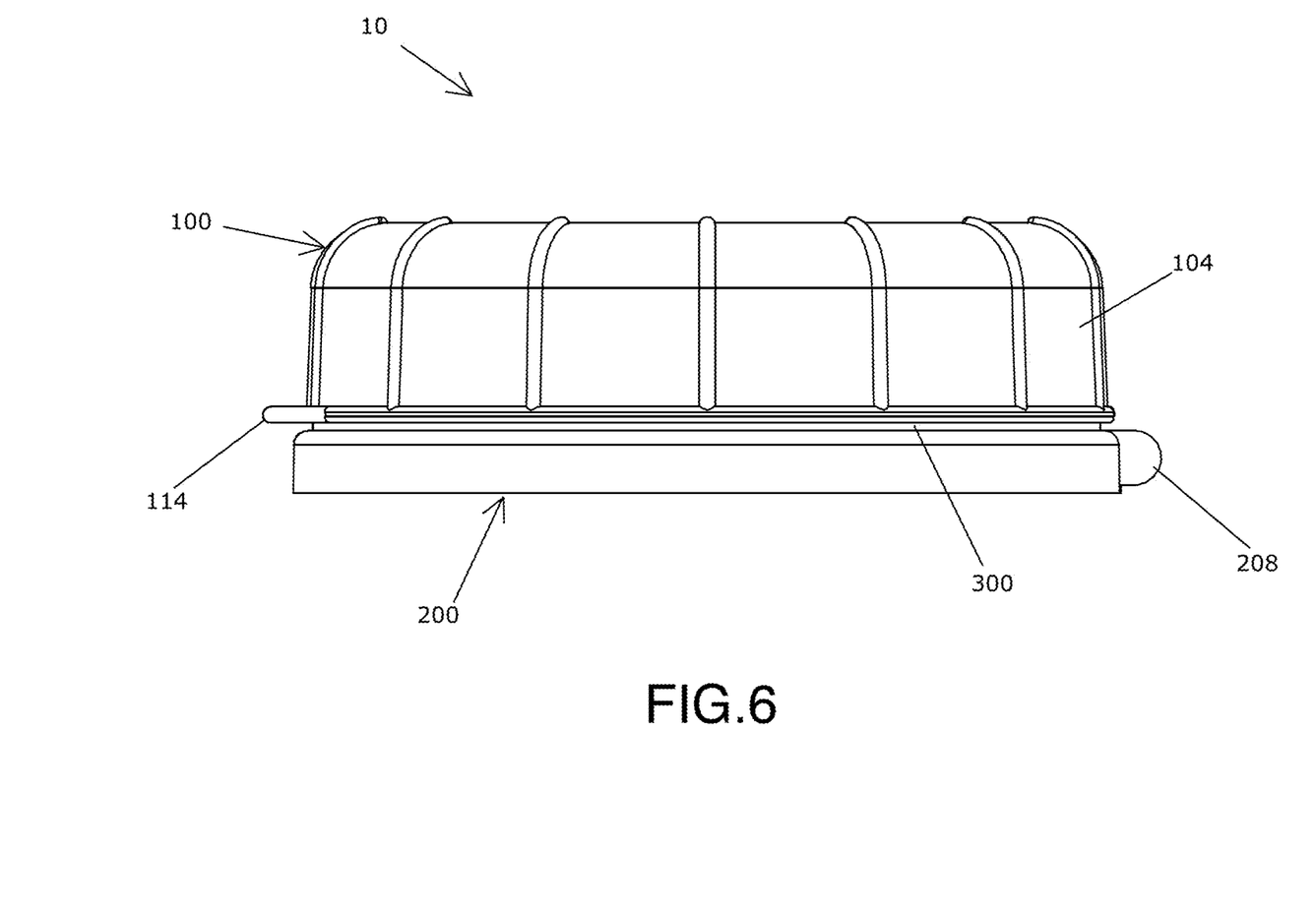
FIG. 6 is a plan view of another side of the example closure of FIG. 1.

The top wall 102 may include a first continuous annular ridge 110, also referred to as a first bead, in the vicinity of and offset from the periphery 103 of the top wall 102. The first annular ridge 110 may protrude inwardly from the top wall 102 and be designed to fit with the opening of the bottle, when the cap portion 100 is closed over the opening, to help inhibit leakage of liquid from the bottle. The top wall 102 may have a stopper 112 extending inwardly therefrom. The stopper 112 may be designed to fit snugly within the opening of the bottle, when the cap portion 100 is closed over the opening, to help inhibit leakage of liquid from the bottle. The stopper 112 may be substantially tubular in shape (e.g., where the opening in the bottle is circular in shape), and may flare out and/or thicken as it extends from the top wall 102, in order to more snugly fit within the opening of the bottle and to help provide a liquid-tight seal against the bottle.

The side wall 104 may be provided with a second continuous annular ridge 108, also referred to as a second bead, protruding inwardly from the side wall 104. The second annular ridge 108 may be designed to fit with the outside surface of the neck of the bottle, to help inhibit leakage of liquid from the bottle.

The presence of the first and/or second continuous annular ridge 110, 108, together with the stopper 112, may help to ensure a liquid-tight seal between the cap portion 100 and the bottle opening, while accommodating acceptable or expected dimensional tolerances. This arrangement may help to ensure a liquid-tight seal in a snap-on closure, without requiring the use of threads (as in a screw-on closure). By providing the closure 10 as a snap-on closure, rather than a screw-on closure, the closure 10 may be used to close openings in bottles, such as milk bottles, which conventionally do not have threads. Although the drawings show an example closure 10 having both first and second annular ridges 110, 108, in some example there may be only one annular ridge 110, 108, while still providing a suitable seal.

A cap tab 114 may be provided on the outside surface of the cap portion 100, for example on the outside surface of the side wall 104. The cap tab 114 may facilitate manual removal of the cap portion 100 from the opening of the bottle.

The latch ring portion 200 may include a plurality of resiliently deformable teeth 202 extending from the inner surface of the latch ring portion 200. The teeth 202 may extend inwardly and towards the cap portion 100. The teeth 202 may be connected to the latch ring portion 200 at a proximal end 204 and may be reinforced (e.g., thicker and/or having an inwardly-extending ridge) at the distal end 206. The teeth 202 may be designed to engage the latch ring portion 200 onto the neck of the bottle, when the closure 10 is fitted onto the opening of the bottle. The reinforcement of the teeth 202 at the distal end 206 may help the teeth 202 to more effectively engage with the neck of the bottle, and prevent removal of the latch ring portion 200 from the bottle by brute force (i.e., without using rupturing the frangible connector 300). The teeth 202 may extend from the inner surface of the latch ring portion 200 in a non-perpendicular angle that facilitates fitting the latch ring portion 200 down over the neck of the bottle but that resists removal of the latch ring portion 200, once it has been fitted over the bottle. The resiliency of the teeth 202 may be such that they can be bent back against the inner surface of the latch ring portion 200 to enable the closure 10 to be fitted over the neck of the bottle, and they can resiliently return to the unbent position to prevent removal of the closure 10 from the bottle unless the latch ring portion 200 is removed, as described below.

In the example shown, there are five teeth 202 extending from the latch ring portion 200, however there may be more or less teeth 202, as suitable. The dimensions of the teeth 202 may be adjusted to ensure that the teeth 202 sufficiently engage with the neck of the bottle, to prevent removal of the closure 10 from the bottle by brute force. For example, where there are fewer teeth 202, the width of each tooth 202 may be wider, so that each tooth 202 extends along a greater portion of the latch ring portion 200. In another example, where there are more teeth 202, the width of each tooth 202 may be narrower, so that each tooth 202 extends along a lesser portion of the latch ring portion 200.

The latch ring portion 200 may include a latch tab 208 projecting from the outer surface of the latch ring portion 200. The latch tab 208 may facilitate application of a manual force to rupture the frangible connector 300 and disconnect the cap portion 100 from the latch ring portion 200. For example, the latch tab 208 may be bent back by a manual force and gripped to rip open the frangible connector 300.

The latch ring portion 200 may not be a continuous ring, but instead may include a gap 210 at or near the location of the latch tab 208. This gap may be bridged by a thin, frangible bar 212. The presence of the gap 210 may facilitate rupture of the frangible connector 300 by allowing the latch tab 208 to be more easily bent back. The frangible bar 212 may help keep the latch tab 208 from being unintentionally bent back, and the frangible bar 212 may be broken when manual force is applied to the latch tab 208.

When the closure 10 is fitted over the neck of the bottle and prior to rupture of the frangible connector 300, the presence of the teeth 202 and the connection of the cap portion 100 to the latch ring portion 200 (via the frangible connector 300) may prevent the cap portion 100 from being removed from the bottle opening. When force is applied to the latch tab 208, the frangible connector 300 may be ruptured and the latch ring portion 200 may be removed (e.g., torn off laterally) from the cap portion 100. Disconnection of the cap portion 100 from the latch ring portion 200 may allow the cap portion 100 to be removed from the opening of the bottle. In some examples, the latch ring portion 200 may not be fully disconnected from the cap portion 100, but may be only partially disconnected from the cap portion 100, sufficient to disengage the teeth 202 from the neck of the bottle and permit removal of the cap portion 100 from the opening. Regardless, rupture of the frangible connector 300 may provide visible evidence that the bottle has been opened or tampered with. As explained above, the teeth 202 may be sufficiently robust to prevent removal of the closure 10 from the bottle unless the frangible connector 300 is ruptured. After the cap portion 100 is removed from the opening of the bottle, the cap portion 100 may be fitted back (e.g., snapped on) over the opening, to reclose the opening with a liquid-tight seal. The now disconnected latch ring portion 200 may be discarded.

The closure 10 may be manufactured in a one-piece molding process, using a single mold. All the components of the closure 10 may be molded integrally. This one-step process may help to simplify manufacturing and/or reduce manufacturing costs. This one-piece molding process may also be useful to control the dimensions of the closure 10 to within a relatively tight dimensional tolerance (e.g., within ±0.005"), to help ensure that the cap portion 100 forms a liquid-tight seal when fitted on the opening. The closure 10 may be molded using any suitable polymer, for example any suitable food-grade plastic when used as a closure for a food container (e.g., used as a cap on a milk bottle). Suitable polymers may include polypropylene, for example. In some examples, a combination of two or more polymers may be used. Additives such as colorants and/or UV inhibitors, for example, may be added.

Figure 7:
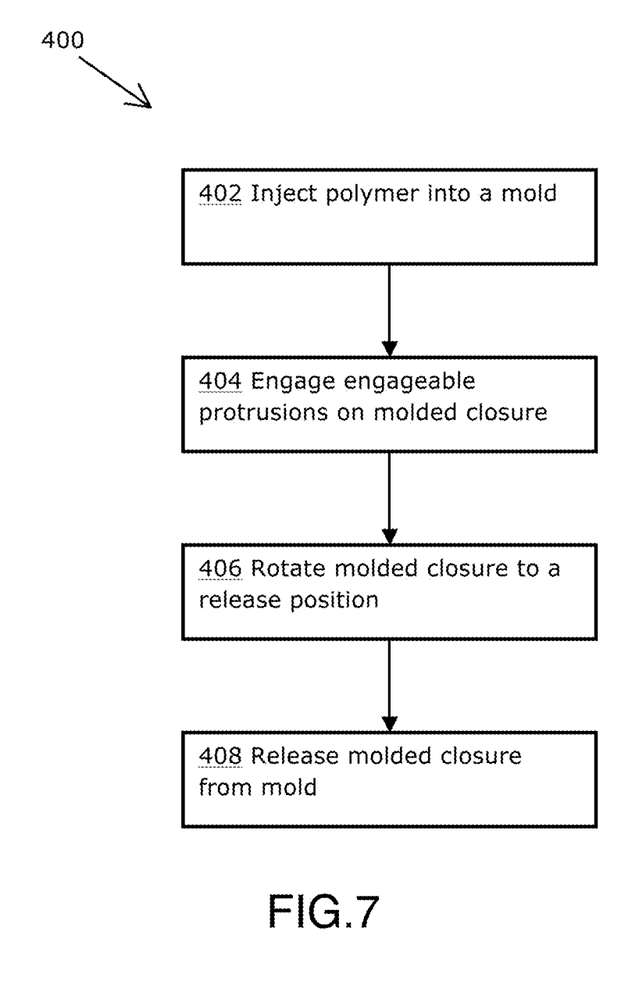
FIG. 7 is a flowchart illustrating an example method for manufacturing a closure in accordance with the present disclosure.

FIG. 7 is a flowchart illustrating an example method 400 for manufacturing a tamper evident closure, such as the closure 10 described above.

At 402, a suitable polymer is injected into a mold, and the closure 10 is formed in the mold using suitable one-piece molding techniques. Conventionally, release of the molded closure 10 from the mold may involve simply pushing the molded closure 10 out of the mold. However, because the teeth 202 protrude inwardly at an angle, they may be caught in the corresponding mold cavities that were used to mold the teeth 202. Conventionally, the teeth 202 may thus need to be bent back in order to be released from the mold. This may require that the teeth 202 be relatively bendable (e.g., formed to be relatively thin) and/or may damage the integrity of the teeth 202. The result is that the robustness of the teeth 202 may be compromised, decreasing the ability of the teeth 202 to resist removal of the latch ring portion 200 by brute force (i.e., without rupturing the frangible connector 300).

In the present disclosure, the presence of engageable protrusions 106 allow the molded closure 10 to be engaged, at 404, by a release apparatus (e.g., an apparatus having protrusions or depressions complementary to the protrusions 106 on the closure 10) and rotated, at 406, to a release position. When the closure 10 is rotated to the release position, the closure 10 may be still within the mold but be rotated such that the teeth 202 are freed from their corresponding mold cavities, without having to sacrifice the robustness of the teeth 202.

At 408, the molded closure 10 may be released from the mold. Since the teeth 202 have been rotated out from their corresponding mold cavities, the release of the molded closure 10 may be accomplished without having to bend back or risk damage to the teeth 202.

Because the teeth 202 are freed from the mold cavities by this rotating operation and do not need to be bent back against the mold to be released, the teeth 202 may be designed to be thicker, more robust and may include a reinforced section at the distal end 206. The reinforced section at the distal end 206 can be made perpendicular to the sidewall, for more robust gripping of the neck of the bottle, enhancing the tamper-evident qualities of the closure. Thus, the method 400 may facilitate manufacture of a closure 10 that is more resistant to brute force removal from the bottle.

Once the closure 10 has been molded, it may be cleaned, labeled and fitted over the opening of the bottle using suitable techniques.

The embodiments of the present disclosure described above are intended to be examples only. The present disclosure may be embodied in other specific forms. Alterations, modifications and variations to the disclosure may be made without departing from the intended scope of the present disclosure. While the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. Selected features from one or more of the above-described embodiments may be combined to create alternative embodiments not explicitly described. All values and subranges within disclosed ranges are also disclosed. The subject matter described herein intends to cover and embrace all suitable changes in technology. All references mentioned are hereby incorporated by reference in their entirety.

The invention claimed is:

1. A one piece molded tamper evident push-on closure suitable for closing an opening of a bottle, comprising:
   a cap portion comprising a sidewall and a top wall;
   a plurality of engageable protrusions on an inner surface of the top wall of the cap portion for rotation of the closure during molding;
   a latch ring portion;
   a plurality of resiliently deformable teeth extending at an acute angle relative to said sidewall and inwardly from the latch ring portion and towards the cap portion for engaging the latch ring portion onto a neck of the bottle, each of said teeth being connected to the latch ring portion at a proximal end and having a distal end;
   a frangible connector connecting the cap portion and the latch ring portion; and
   a manually engageable tab projecting from the latch ring portion to permit application of a manual force to rupture the frangible connector and permit the cap portion to be at least partially disconnected from the latch ring portion;
   wherein the distal end of all of said teeth have a reinforced ridge extending radially inwardly from the distal edge of each of said teeth.

2. The closure of claim 1, further comprising a first continuous annular ridge protruding inwardly from the top wall of the cap portion for engaging an outer edge of the opening of the bottle.

3. The closure of claim 2, further comprising a second continuous annular ridge protruding inwardly from the sidewall of the cap portion for engaging the neck of the bottle.

4. The closure of claim 3, further comprising a stopper extending from an inner surface of the top wall of the cap portion for fitting inside the opening of the bottle to provide a liquid-tight seal against an inner edge of the opening.

5. The closure of claim 4, wherein the stopper has a substantially tubular cross-section that flares outwardly as it extends from the inner surface of the top wall.

6. The closure of claim 1, wherein the frangible connector comprises a section of material that has a thickness less than a thickness of the cap portion and the latch ring portion.

7. The closure of claim 1, wherein the engageable protrusions are arranged in a spoke-like formation on an inner surface of the top wall.

8. A one piece molded push-on closure suitable for closing an opening of a bottle, comprising:
 a cap portion comprising a sidewall and a top wall;
 a stopper extending from an inner surface of the top wall of the cap portion for fitting inside the opening of the bottle to provide a liquid-tight seal against an inner edge of the opening; wherein the stopper flares outward from a center of the cap portion;
 a first continuous annular ridge protruding inwardly from the top wall of the cap portion for engaging an outer edge of the opening of the bottle to provide a further liquid-tight seal against the outer edge of the opening;
 a second continuous annular ridge protruding inwardly from the sidewall of the cap portion for engaging a neck of the bottle;
 a latch ring portion;
 a plurality of resiliently deformable teeth extending inwardly from the latch ring portion and towards the cap portion for engaging the latch ring portion onto the neck of the bottle;
 a frangible connector connecting the cap portion and the latch ring portion; and
 a manually engageable tab projecting from the latch ring portion to permit application of a manual force to rupture the frangible connector and permit the cap portion to be at least partially disconnected from the latch ring portion.

9. The closure of claim 8, wherein the stopper has a substantially tubular cross-section that flares outwardly as it extends from the inner surface of the top wall.

10. A one piece molded push-on closure suitable for closing an opening of a bottle, comprising:
 a cap portion comprising a sidewall and a top wall;
 a stopper extending from an inner surface of the top wall of the cap portion for fitting inside the opening of the bottle to provide a liquid-tight seal against an inner edge of the opening, wherein the stopper flares outward from a center of the cap portion;
 a first continuous annular ridge protruding inwardly from the top wall of the cap portion for engaging an outer edge of the opening of the bottle to provide a further liquid-tight seal against the outer edge of the opening;
 a second continuous annular ridge protruding inwardly from the sidewall of the cap portion for engaging a neck of the bottle;
 a latch ring portion;
 a plurality of resiliently deformable teeth extending inwardly from the latch ring portion and towards the cap portion for engaging the latch ring portion onto the neck of the bottle; and
 a frangible connector connecting the cap portion and the latch ring portion;
wherein the frangible connector comprises a section of material that has a thickness less than the thickness of the cap portion and the latch ring portion.

11. A one piece molded push-on closure suitable for closing an opening of a bottle, comprising:
 a cap portion comprising a sidewall and a top wall;
 a stopper extending from an inner surface of the top wall of the cap portion for fitting inside the opening of the bottle to provide a liquid-tight seal against an inner edge of the opening, wherein the stopper flares outward from a center of the cap portion;
 a first continuous annular ridge protruding inwardly from the top wall of the cap portion for engaging an outer edge of the opening of the bottle to provide a further liquid-tight seal against the outer edge of the opening;
 a second continuous annular ridge protruding inwardly from the sidewall of the cap portion for engaging a neck of the bottle;
 a latch ring portion;
 a plurality of resiliently deformable teeth extending inwardly from the latch ring portion and towards the cap portion for engaging the latch ring portion onto the neck of the bottle; and
 a frangible connector connecting the cap portion and the latch ring portion;
wherein a reinforced distal end of each of said teeth comprises an inwardly extending ridge.

12. A molded tamper evident push-on closure suitable for closing an opening of a bottle, comprising:
 a cap portion comprising a sidewall and a top wall;
 a latch ring portion;
 a plurality of resiliently deformable teeth extending at an acute angle relative to said sidewall and inwardly from the latch ring portion and upwardly towards the cap portion to an apex, for engaging the latch ring portion onto a neck of the bottle, each of said teeth being connected to the latch ring portion at a proximal end and having a distal end;
 a frangible connector connecting the cap portion and the latch ring portion; and
 a manually engageable tab projecting from the latch ring portion to permit application of a manual force to rupture the frangible connector and permit the cap portion to be at least partially disconnected from the latch ring portion;
wherein all of said teeth have a ridge extending inwardly from said apex towards the neck of the bottle, perpendicular to said sidewall.

\* \* \* \* \*